S. Hiestand,
Corn Planter.

No. 113,718.   Patented Apr. 11, 1871.

Witnesses:
Wash. Doggett
Henry Spargus

Samuel Hiestand
Inventor

UNITED STATES PATENT OFFICE.

SAMUEL HIESTAND, OF HILLSBOROUGH, OHIO.

IMPROVEMENT IN COMBINED PLANTERS AND SEEDERS.

Specification forming part of Letters Patent No. 113,718, dated April 11, 1871.

I, SAMUEL HIESTAND, of Hillsborough, in the county of Highland and State of Ohio, have invented new and useful Improvements in Combined Planter and Seeder; and I do hereby declare that the following is a full and complete description of the construction and operation of the same, reference being had to the accompanying drawing, making part of this specification, in which—

Figure 1:
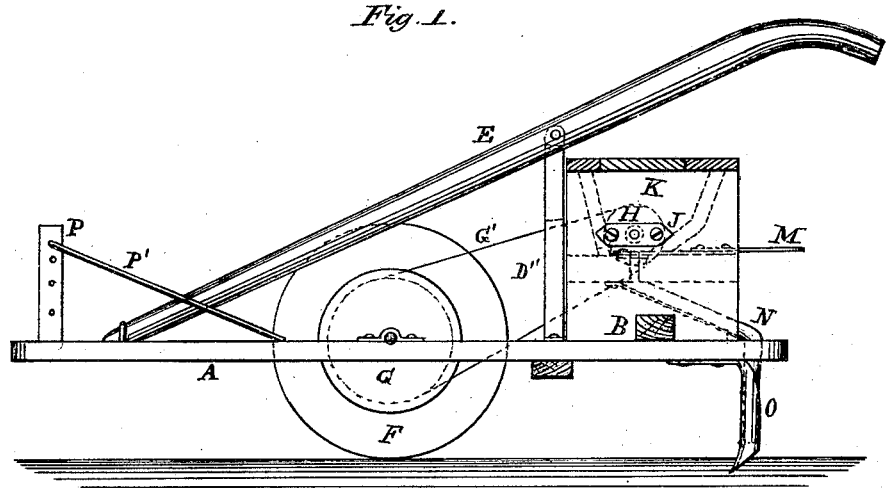
Figure 2:
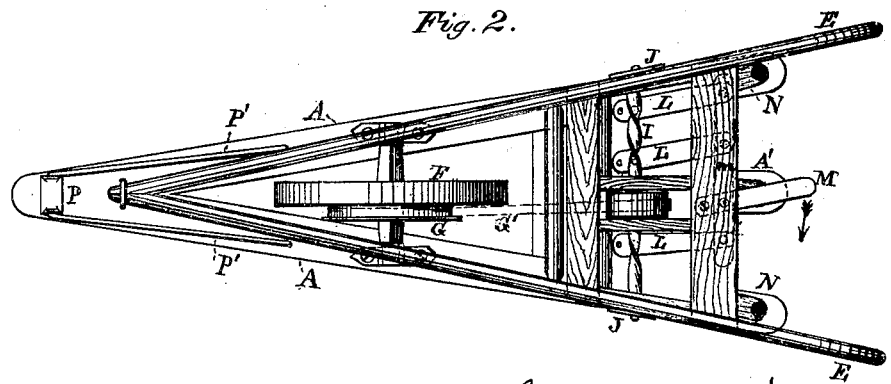

Figure 1 is a side view, and Fig. 2 is a top view.

Like letters refer to like parts in the different views.

A A represent the frame of the machine; and it consists of two rectangular beams about six feet long, united at their front ends, and diverging so that their rear ends are about three or four feet apart. A' represents a short middle piece, framed into or secured to the cross-beam B, equidistant from the side pieces, A A, as shown in Fig. 2. C represents a cross-beam, placed a foot or more forward of the beam B, and from this position rise the standards that support the handles E E. The forward ends of the handles are secured to the united ends of the beams A A by a staple-bolt, as shown.

F represents a traction-wheel, placed a little forward of the middle of the frame and midway between them, and which supports the forward end. G is a band-wheel, used to give motion to the band G', that drives the pulley H upon the agitator-shaft. I represents the agitator, and it consists of a flat twisted bar, as shown in Fig. 2, with the pulley H placed a little one side of the center. The ends are formed into journals, which have their supports in the plates J upon the ends of the seed-box K. This seed-box is divided into two compartments of unequal dimensions. The smallest has but one discharge-opening, the larger one has two, and all are situated immediately beneath the agitator I.

L L L represent three valves, which are pivoted at their forward ends to the bottom of the hopper or seed-box K, the rear ends being connected by a bar, $m$, (shown in dotted lines,) and all are moved simultaneously by means of the pivoted lever M. N represents an open spout leading from the seed-opening in the bottom of the seed-box (there being one for each opening) to the drill-tooth O, which is hollow and secured to the under side of the beams A A' A, which are perforated to admit the flow of seed. The lower ends of the teeth O terminate in the usual form of a furrow-opener. The forward end of the frame is provided with a standard, P, secured to the frame and supported by the braces P', and to this standard the draft is attached at different heights, as may be desired.

When this machine is used as a drill, seed is placed in both divisions of the seed-box, and by moving the lever M in the direction of the arrow the quantity of seed sown can be regulated, and in the forward progression of the machine the agitator is rotated, and the seed passes down the inclined spouts N to the hollow drill-teeth O, and through them to the ground, and are covered by the soil falling back upon them. If it is desired to plant but a single row at a time, the seed is put into the apartment having but one seed-opening.

It is obvious that the drill-teeth can be multiplied to any desired extent without changing the general features of the improvement.

What I claim as my improvement, and desire to secure by Letters Patent, is—

The machine herein described, consisting of the frame A A', traction-wheel F, band-wheel G, seed-box K, and seeding device H I L M N O, all arranged as herein specified.

SAMUEL HIESTAND.

Witnesses:
 WASH. DOGGETT,
 HENRY SPARGUS.